(12) United States Patent
Teng

(10) Patent No.: US 9,429,789 B2
(45) Date of Patent: Aug. 30, 2016

(54) LIQUID CRYSTAL DISPLAY MODULE AND LIQUID CRYSTAL DISPLAY PANEL THEREOF

(71) Applicant: Yong Teng, Jiangsu Province (CN)

(72) Inventor: Yong Teng, Jiangsu Province (CN)

(73) Assignee: CORETRONIC(SUZHOU)CO., LTD, Jiangsu Province (CN)

( * ) Notice: Subject to any disclaimer, the term of this patent is extended or adjusted under 35 U.S.C. 154(b) by 0 days.

(21) Appl. No.: 14/753,026

(22) Filed: Jun. 29, 2015

(65) Prior Publication Data

US 2016/0048052 A1 Feb. 18, 2016

(30) Foreign Application Priority Data

Aug. 15, 2014 (CN) .......................... 2014 1 0401173

(51) Int. Cl.
*G02F 1/1335* (2006.01)

(52) U.S. Cl.
CPC ................... *G02F 1/133514* (2013.01); *G02F 2001/133567* (2013.01); *G02F 2201/52* (2013.01)

(58) Field of Classification Search
CPC ................................................ G02F 1/133514
See application file for complete search history.

(56) References Cited

U.S. PATENT DOCUMENTS

| | | | | |
|---|---|---|---|---|
| 3,569,614 A * | 3/1971 | Hanlon | ............. | G02F 1/133514 345/88 |
| 4,560,241 A * | 12/1985 | Stolov | ............... | G02F 1/133514 349/106 |
| 4,877,309 A * | 10/1989 | Takamatsu | ........ | G02F 1/133514 349/80 |
| 5,159,478 A * | 10/1992 | Akiyama | .......... | G02F 1/133504 349/106 |
| 5,442,467 A * | 8/1995 | Silverstein | ............... | G02B 6/08 349/106 |
| 5,555,114 A * | 9/1996 | Narita | ............... | G02F 1/133514 349/97 |
| 5,734,457 A * | 3/1998 | Mitsui | ............... | G02F 1/133514 349/105 |
| 5,982,464 A * | 11/1999 | Wang | ................ | G02F 1/133753 349/106 |
| 6,909,485 B2 * | 6/2005 | Yoon | ................. | G02F 1/133514 349/106 |
| 7,079,207 B2 * | 7/2006 | Kashima | ........... | G02F 1/133514 349/106 |
| 7,221,417 B2 | 5/2007 | Togashi | | |
| 7,292,298 B2 * | 11/2007 | Ko | .................... | G02F 1/133555 349/106 |
| 2001/0020990 A1 * | 9/2001 | Moon | ............... | G02F 1/133514 349/96 |
| 2004/0207783 A1 * | 10/2004 | Togashi | ............ | G02F 1/133516 349/113 |

FOREIGN PATENT DOCUMENTS

TW 201011414 3/2010

* cited by examiner

*Primary Examiner* — James Dudek
(74) *Attorney, Agent, or Firm* — Jianq Chyun IP Office

(57) ABSTRACT

LCD module and LCD panel are provided. The LCD panel includes a first substrate, a liquid crystal layer, a second substrate, a first color filter and a second color filter. The first color filter includes a transparent area and a filter area. The first substrate is located between the first color filter and the liquid crystal layer. The second color filter includes a transparent area and a filter area. The second substrate is located between the second color filter and the liquid crystal layer. An orthogonal projection of the transparent area of the first color filter on the second color filter is coincided with the filter area of the second color filter. An orthogonal projection of the filter area of the first color filter on the second color filter is coincided with the transparent area of the second color filter. The LCD module and LCD panel implement DOF display mode.

24 Claims, 10 Drawing Sheets

LIQUID CRYSTAL DISPLAY MODULE AND LIQUID CRYSTAL DISPLAY PANEL THEREOF

CROSS-REFERENCE TO RELATED APPLICATION

This application claims the priority benefit of Chinese application serial no. 201410401173.4, filed on Aug. 15, 2014. The entirety of the above-mentioned patent application is hereby incorporated by reference herein and made a part of this specification.

BACKGROUND OF THE INVENTION

1. Field of the Invention

The invention relates to a display module and a display panel thereof, and particularly relates to a liquid crystal display (LCD) module and a LCD panel thereof.

2. Description of Related Art

In a known liquid crystal display (LCD) module, a backlight source, a single color filter, a pair of substrates clamping a liquid crystal layer and a pair of polarizers with perpendicular optical axis are used to provide planar color imaging, though the known LCD module cannot implement a depth of field (DOF) display mode.

U.S. Pat. No. 7,221,417B2 discloses an LCD module, in which an upper glass substrate and a lower glass substrate are located at two sides of a liquid crystal layer, two polarizers are located at two sides of the liquid crystal layer, and the upper and lower glass substrates respectively have a color filter, where densities of the pair of color filters are similar, so as to achieve good color reproducibility in a transmission mode and a reflection mode. Taiwan Patent Publication No. 201011414A discloses an LCD module, in which a first display panel includes a first thin film transistor array substrate, a first color filter substrate and a first liquid crystal layer, and a second display panel includes a second thin film transistor array substrate, a second color filter substrate and a second liquid crystal layer, and based on different brightness ratios between each first pixel and a corresponding second pixel, an image observed by an observer may have different DOFs, such that the image may have a three-dimensional effect of different DOFs.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention is directed to a liquid crystal display (LCD) module and an LCD panel thereof, which are capable of implementing a depth of field (DOF) display mode.

Other objects and advantages of the invention can be further illustrated by the technical features broadly embodied and described as follows.

In order to achieve at least one of the objects or other objects, an embodiment of the invention provides a liquid crystal display (LCD) panel. The LCD panel includes a first substrate, a liquid crystal layer, a second substrate, a first color filter and a second color filter. The second substrate is disposed opposite to the first substrate. The second substrate and the first substrate commonly clamp the liquid crystal layer. The first color filter is disposed on a surface of the first substrate. The first color filter includes a transparent area and a filter area. The first substrate is located between the first color filter and the liquid crystal layer. The second color filter is disposed on a surface of the second substrate. The second color filter includes a transparent area and a filter area. The second substrate is located between the second color filter and the liquid crystal layer. An orthogonal projection of the transparent area of the first color filter on the second color filter is coincided with the filter area of the second color filter. An orthogonal projection of the filter area of the first color filter on the second color filter is coincided with the transparent area of the second color filter.

In order to achieve at least one of the objects or other objects, an embodiment of the invention provides a liquid crystal display (LCD) module. The LCD module includes an LCD panel and a backlight module. The LCD panel includes a liquid crystal layer, a first substrate, a second substrate, a first color filter and a second color filter. The second substrate is disposed opposite to the first substrate. The second substrate and the first substrate commonly clamp the liquid crystal layer. The first color filter is disposed on a surface of the first substrate. The first color filter includes a transparent area and a filter area. The first substrate is located between the first color filter and the liquid crystal layer. The second color filter is disposed on a surface of the second substrate. The second color filter includes a transparent area and a filter area. The second substrate is located between the second color filter and the liquid crystal layer. An orthogonal projection of the transparent area of the first color filter on the second color filter is coincided with the filter area of the second color filter. An orthogonal projection of the filter area of the first color filter on the second color filter is coincided with the transparent area of the second color filter. The backlight module is used for providing a light beam. The light beam passes through the LCD panel to provide a depth of field (DOF) display mode.

In one embodiment, the transparent area of the first color filter includes a plurality of transparent blocks, the filter area of the first color filter includes a plurality of filter blocks, and the transparent area of the second color filter includes a plurality of transparent blocks, the filter area of the second color filter includes a plurality of filter blocks.

In one embodiment, each of the filter blocks of the first color filter includes a red sub-block, a green sub-block and a blue sub-block, and each of the filter blocks of the second color filter includes a red sub-block, a green sub-block and a blue sub-block.

In one embodiment, the transparent blocks and the filter blocks of the first color filter are arranged in an array on the first color filter.

In one embodiment, the transparent blocks and the filter blocks of the first color filter form a mosaic pattern on the first color filter.

In one embodiment, the transparent blocks and the filter blocks of the first color filter are arranged in a triangle pattern on the first color filter.

In one embodiment, the transparent blocks and the filter blocks of the first color filter are respectively long straight bar-shaped, and the transparent blocks and the filter blocks of the second color filter are respectively long straight bar-shaped.

In one embodiment, the transparent blocks and the filter blocks of the first color filter are arranged on the first color filter along a first direction, and extend along a second direction, and the transparent blocks and the filter blocks of the second color filter are arranged on the second color filter along the first direction, and extend along the second direction.

In one embodiment, the transparent blocks and the filter blocks of the first color filter form a straight bar pattern on the first color filter.

In one embodiment, on the first color filter, the transparent blocks and the filter blocks of the first color filter are arranged in interleaving, and on the second color filter, the transparent blocks and the filter blocks of the second color filter are arranged in interleaving.

In one embodiment, on the first color filter, the filter area of the first color filter surrounds the transparent area of the first color filter, and on the second color filter, the transparent area of the second color filter surrounds the filter area of the second color filter.

In one embodiment, the LCD panel further includes a first polarizer and a second polarizer. The first polarizer disposed on the first substrate, wherein the first color filter is disposed between the first polarizer and the first substrate. The second polarizer disposed under the second substrate, wherein the second color filter is disposed between the second polarizer and the second substrate.

According to the above descriptions, the embodiments of the invention have at least one of following advantages or effects. In the LCD panel and the LCD module of the invention, the first color filter includes the transparent area and the filter area. The second color filter includes the corresponding transparent area and the filter area. The orthogonal projections of the transparent area and the filter area of the first color filter on the second color filter are respectively coincided with the filter area and the transparent area of the second color filter. The light beam is filtered by the first color filter and the second color filter of the LCD panel to provide the DOF display mode.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
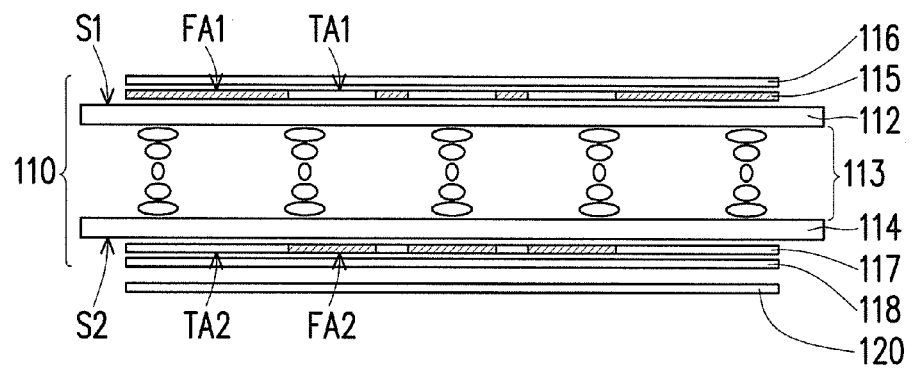
FIG. 1 is a cross-sectional view of a liquid crystal display (LCD) module according to an embodiment of the invention.

FIG. 1 is a cross-sectional view of a liquid crystal display (LCD) module according to an embodiment of the invention. Referring to FIG. 1, the LCD module 100 of the embodiment includes an LCD panel 110 and a backlight module 120. The LCD panel 110 includes a liquid crystal layer 113, a first substrate 112, a second substrate 114, a first color filter 115, a second color filter 117, a first polarizer 116 and a second polarizer 118. The second substrate 114 is disposed opposite to the first substrate 112. The second substrate 114 and the first substrate 112 commonly clamp the liquid crystal layer 113. The first color filter 115 is disposed on a surface S1 of the first substrate 112. The surface S1 of the first substrate 112 faces away the liquid crystal layer 113. The first substrate 112 is located between the first color filter 115 and the liquid crystal layer 113. The second color filter 117 is disposed on a surface S2 of the second substrate 114. The surface S2 of the second substrate 114 faces away the liquid crystal layer 113. The second substrate 114 is located between the second color filter 117 and the liquid crystal layer 113. The first polarizer 116 is disposed on the first substrate 112, wherein the first color filter 115 is disposed between the first polarizer 116 and the first substrate 112. The second polarizer 118 is disposed under the second substrate 114, wherein the second color filter 117 is disposed between the second polarizer 118 and the second substrate 114.

In the embodiment, the first color filter 115 includes a transparent area TA1 and a filter area FA1. The second color filter 117 includes a transparent area TA2 and a filter area FA2. An orthogonal projection of the transparent area TA1 of the first color filter 115 on the second color filter 117 is coincided with the filter area FA2 of the second color filter 117. An orthogonal projection of the filter area FA1 of the first color filter 115 on the second color filter 117 is coincided with the transparent area TA2 of the second color filter 117. The backlight module 120 is used for providing a light beam. The light beam is filtered by the first color filter 115 and the second color filter 117 of the LCD panel 110 to provide a depth of field (DOF) display mode. In the embodiment, the backlight module 120 is disposed below the LCD panel 110. However, the invention is not limited thereto. In other embodiments, the backlight module 120 can also be disposed above the LCD panel 110.

In detail, in the embodiment, the transparent area TA1 and the filter area FA1 of the first color filter 115 respectively correspond to the filter area FA2 and the transparent area TA2 of the second color filter 117. The light beam provided by the backlight module 120 is polarized by the second polarizer 118, and enters the transparent area TA2 of the second color filter 117. Then, the light beam is deflected by liquid crystal molecules in the liquid crystal layer 113, and is filtered by the filter area FA1 of the first color filter 115. Then, the light beam passes through the first polarizer 116 to form a first display image. On the other hand, the light beam provided by the backlight module 120 is polarized by the second polarizer 118, and enters the filter area FA2 of the second color filter 117 and is filtered by the filter area FA2 of the second color filter 117. Then, the light beam is deflected by liquid crystal molecules in the liquid crystal layer 113, and passes through the transparent area TA1 of the first color filter 115. Then, the light beam passes through the first polarizer 116 to form a second display image. In collaboration with a distance between the first color filter 115 and the second color filter 117, the combination of the first display image and the second display image may implement the DOF display mode.

Figure 2:
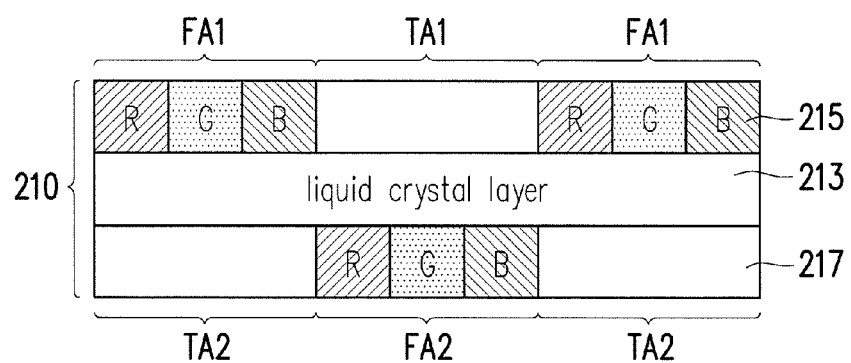
FIG. 2 is a partial cross-sectional view of an LCD panel according to an embodiment of the invention.
Figure 3:
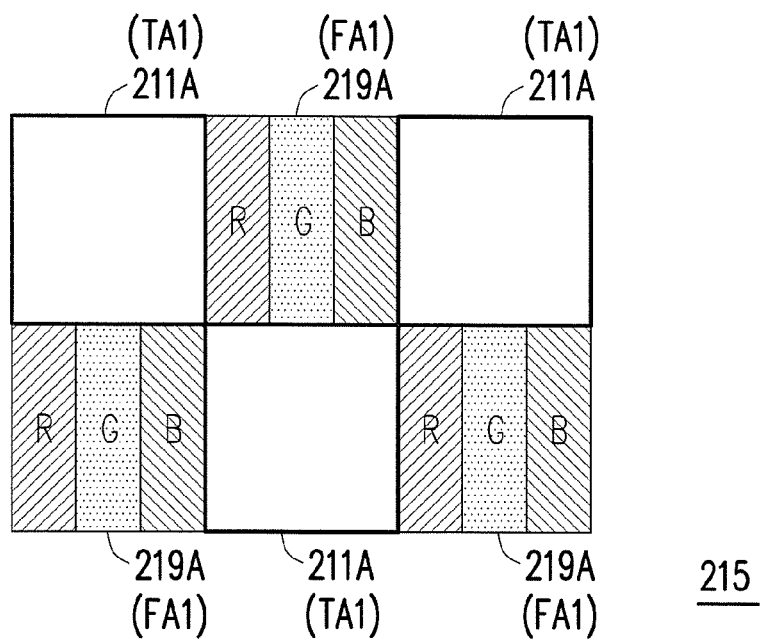
FIG. 3 and FIG. 4 are respectively top views of a first color filter and a second color filter of the embodiment of FIG. 2.
Figure 4:
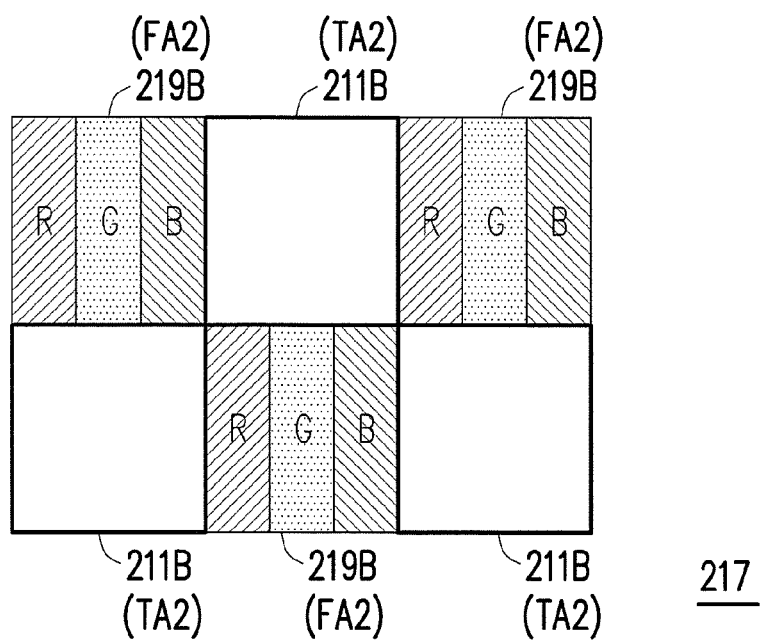

FIG. 2 is a partial cross-sectional view of an LCD panel according to an embodiment of the invention. FIG. 3 and FIG. 4 are respectively top views of the first color filter and the second color filter of the embodiment of FIG. 2. Referring to FIG. 2 to FIG. 4, for clarity's sake, only the liquid crystal layer 213, the first color filter 215 and the second color filter 217 of the LCD panel 210 are illustrated in FIG. 2, though the invention is not limited thereto.

In the embodiment, an orthogonal projection of the transparent area TA1 of the first color filter 215 on the second color filter 217 is coincided with the filter area FA2 of the second color filter 217. An orthogonal projection of the filter area FA1 of the first color filter 215 on the second color filter 217 is coincided with the transparent area TA2 of the second color filter 217.

In the embodiment, the transparent area TA1 of the first color filter 215 includes a plurality of transparent blocks 211A. The filter area FA1 of the first color filter 215 includes a plurality of filter blocks 219A. The transparent area TA2 of the second color filter 217 includes a plurality of transparent blocks 211B. The filter area FA2 of the second color filter 217 includes a plurality of filter blocks 219B. Each of the filter blocks 219A of the first color filter 215 includes a red sub-block R, a green sub-block G and a blue sub-block B. Each of the filter blocks 219B of the second color filter 217 includes the red sub-block R, the green sub-block G and the blue sub-block B. For example, the red sub-block R, the green sub-block G and the blue sub-block B of each of the filter blocks respectively includes red dye, green dye and blue dye, and the transparent blocks do not include red dye, green dye and blue dye. It should be noticed that the invention is not limited thereto. In another embodiment, each of the filter blocks 219A of the first color filter 215 may include the red sub-block, the green sub-block, the blue sub-block and a white sub-block. Each of the filter blocks 219B of the second color filter 217 may include the red sub-block, the green sub-block, the blue sub-block and the white sub-block.

In an embodiment of the invention, the transparent blocks and the filter blocks of the first color filter are arranged in an array on the first color filter. Meanwhile, corresponding to the arranging method of the first color filter, the transparent blocks and the filter blocks of the second color filter are also arranged in an array on the second color filter. It should be noticed that regardless of the type of the above array arrangement, the orthogonal projection of the transparent area of the first color filter on the second color filter is coincided with the filter area of the second color filter, and the orthogonal projection of the filter area of the first color filter on the second color filter is coincided with the transparent area of the second color filter. In the embodiment of the invention, the array arrangement, for example, includes a mosaic pattern or a triangle pattern.

Figure 5:
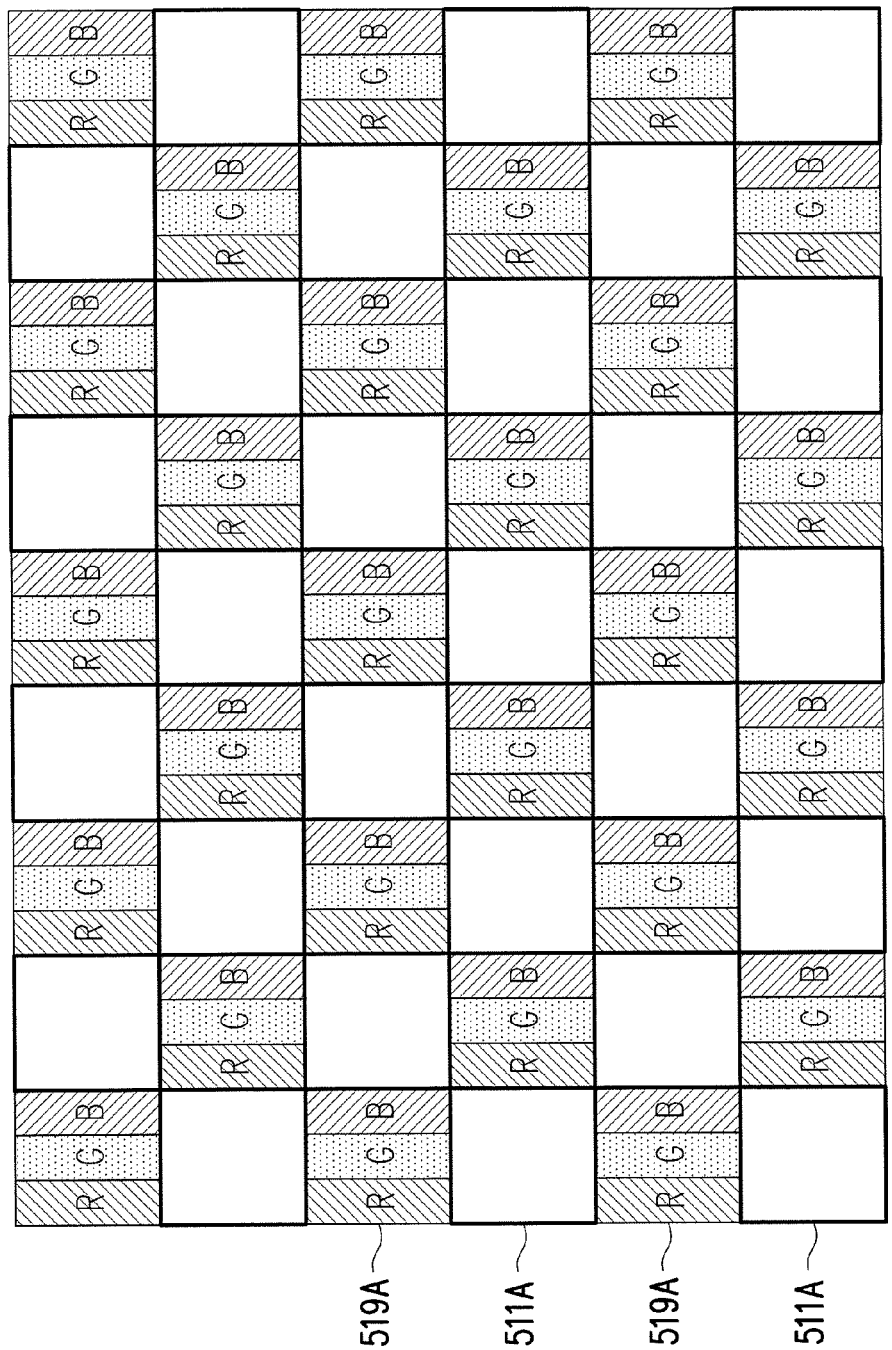
FIG. 5 and FIG. 6 are respectively top views of a first color filter and a second color filter according to an embodiment of the invention.
Figure 6:
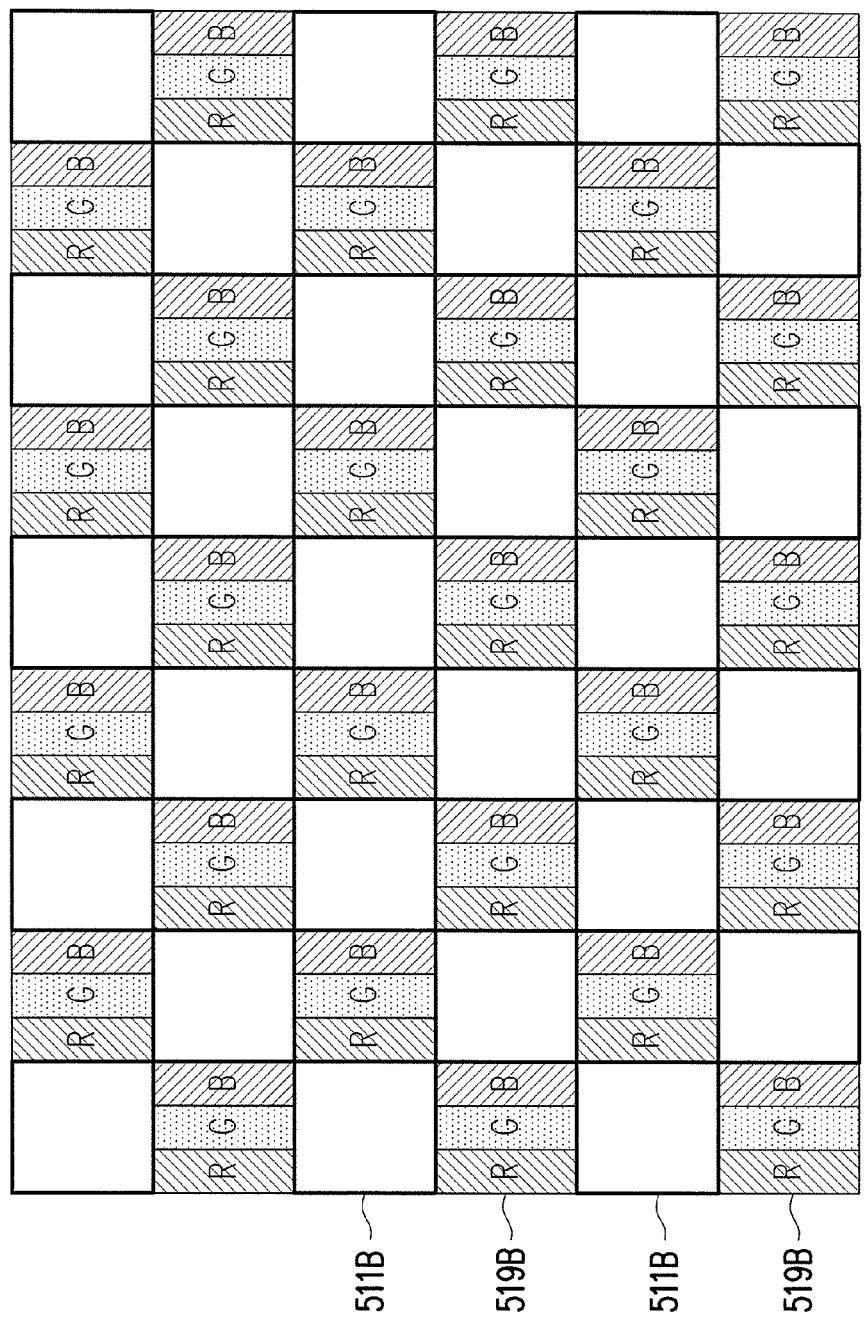

FIG. 5 and FIG. 6 are respectively top views of a first color filter and a second color filter according to an embodiment of the invention. Referring to FIG. 5 and FIG. 6, the first color filter 515 and the second color filter 517 of the embodiment serve as a combination to provide the DOF display mode. Transparent blocks 511A and filter blocks 519A of the first color filter 515 are arranged in interleaving, and transparent blocks 511B and filter blocks 519B of the second color filter 517 are arranged in interleaving. Further, the transparent blocks 511A and the filter blocks 519A of the first color filter 515 are arranged in an array on the first color filter 515 to form mosaic patterns. The transparent blocks 511B and the filter blocks 519B of the second color filter 517 are also arranged in an array on the second color filter 517 to form the mosaic patterns. It should be noticed that in the embodiment, the orthogonal projection of the transparent blocks 511A of the first color filter 515 on the second color filter 517 is coincided with the filter blocks 519B of the second color filter 517, and the orthogonal projection of the filter blocks 519A of the first color filter 515 on the second color filter 517 is coincided with the transparent blocks 511B of the second color filter 517.

Figure 7:
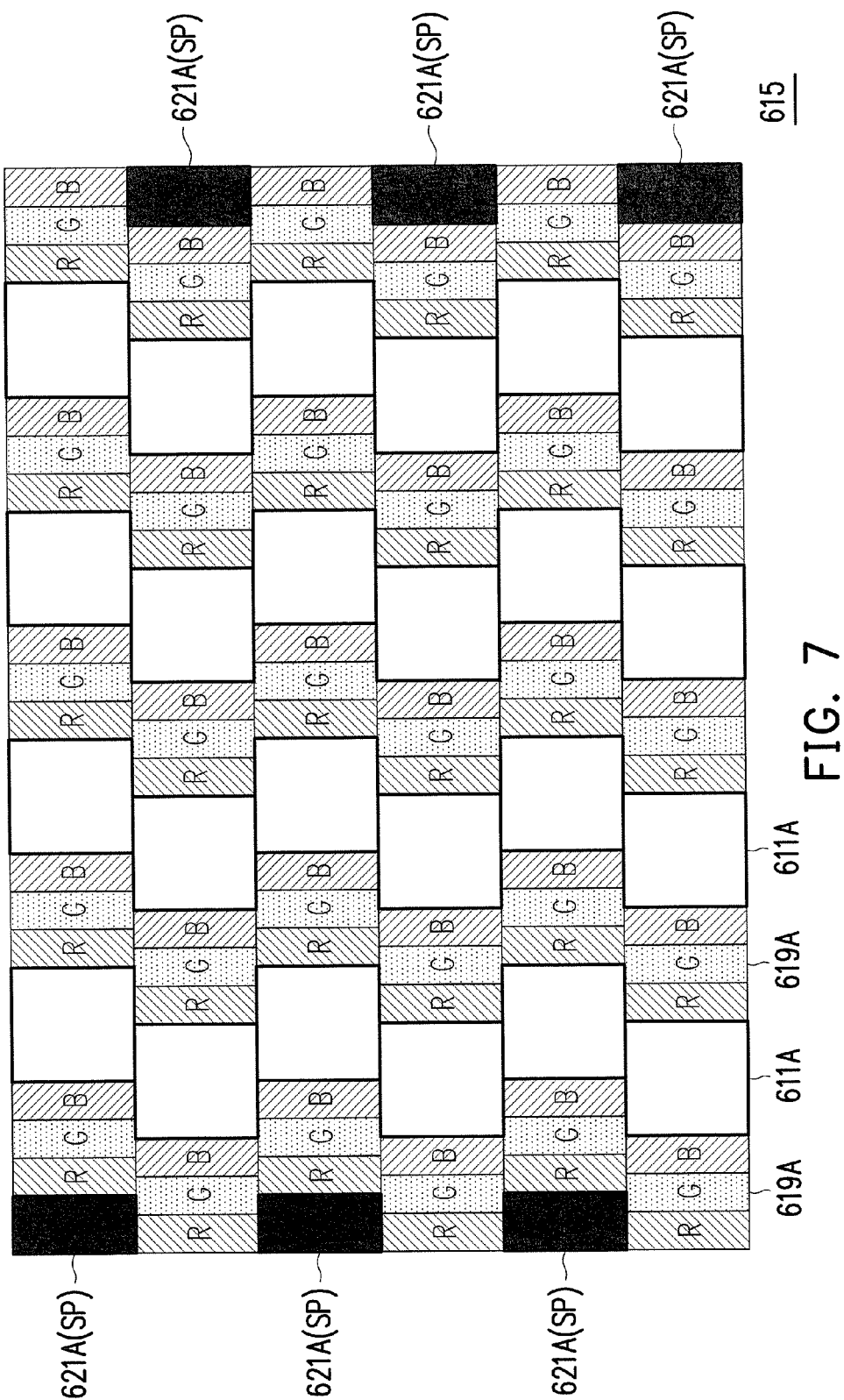
FIG. 7 and FIG. 8 are respectively top views of a first color filter and a second color filter according to another embodiment of the invention.
Figure 8:
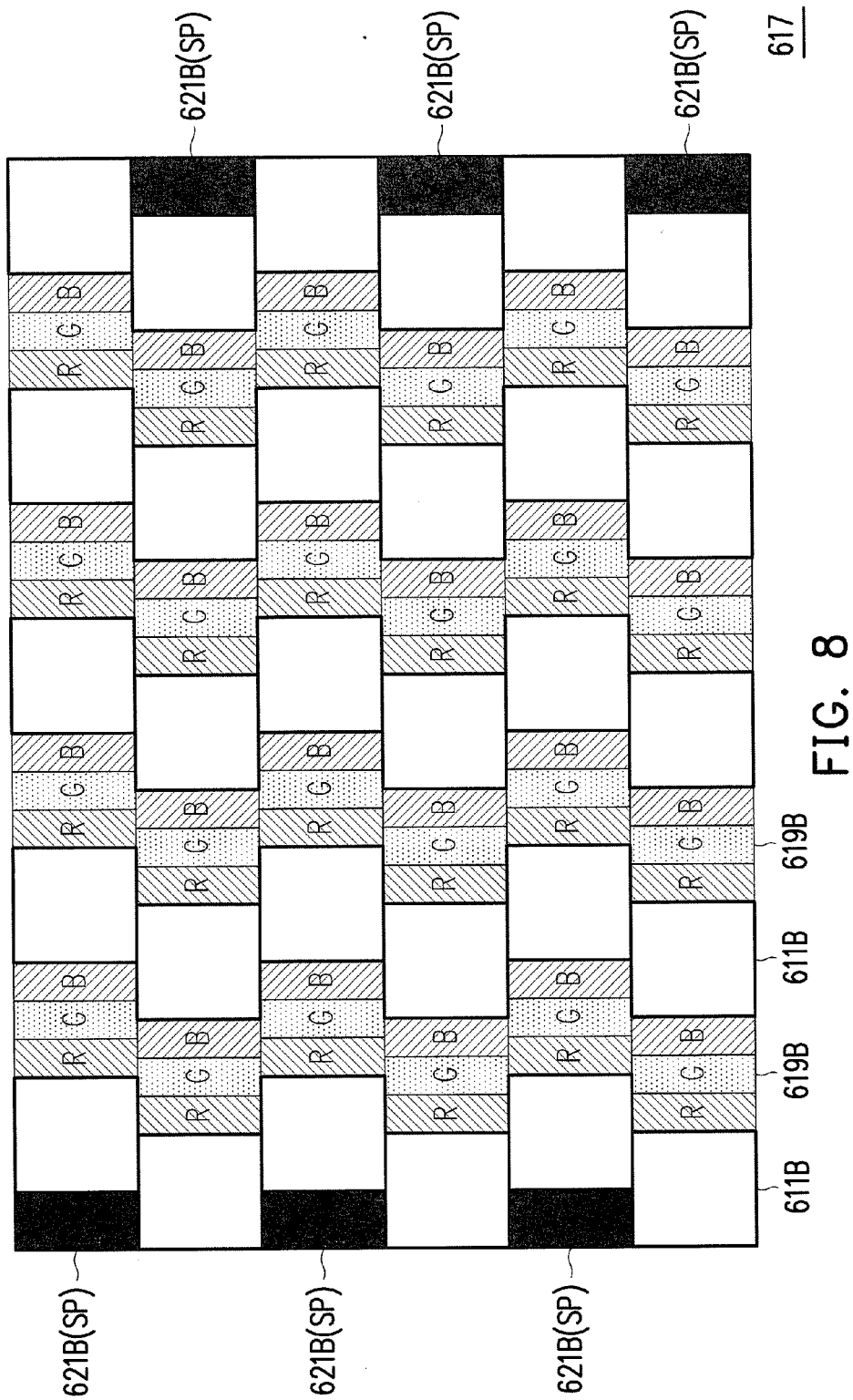

FIG. 7 and FIG. 8 are respectively top views of a first color filter and a second color filter according to another embodiment of the invention. Referring to FIG. 7 and FIG. 8, the first color filter 615 and the second color filter 617 of the embodiment serve as a combination to provide the DOF display mode. Transparent blocks 611A and filter blocks 619A of the first color filter 615 are arranged in interleaving, and transparent blocks 611B and filter blocks 619B of the second color filter 617 are arranged in interleaving. Further, the transparent blocks 611A and the filter blocks 619A of the first color filter 615 are arranged in another type of array on the first color filter 615 to form triangle patterns. The transparent blocks 611B and the filter blocks 619B of the second color filter 617 are also arranged in the other type of array on the second color filter 617 to form the corresponding triangle patterns. It should be noticed that in the embodiment, the orthogonal projection of the transparent blocks 611A of the first color filter 615 on the second color filter 617 is coincided with the filter blocks 619B of the second color filter 617, and the orthogonal projection of the filter blocks 619A of the first color filter 615 on the second color filter 617 is coincided with the transparent blocks 611B of the second color filter 617.

Moreover, in the embodiment, since the LCD panel is a rectangle in overall (referring to FIG. 2 to FIG. 6), the overall appearances of the first color filter 615 and the second color filter 617 of FIG. 7 and FIG. 8 are also designed into rectangles. Therefore, left and right side edges of the first color filter 615 further include opaque blocks 621A to fill rectangular spaces SP, and left and right side edges of the second color filter 617 further include opaque blocks 621B to fill rectangular spaces SP, where the opaque blocks 621A and the opaque blocks 621B are, for example, black blocks, and image is not displayed on positions corresponding to the opaque blocks 621A and the opaque blocks 621B.

Figure 9:
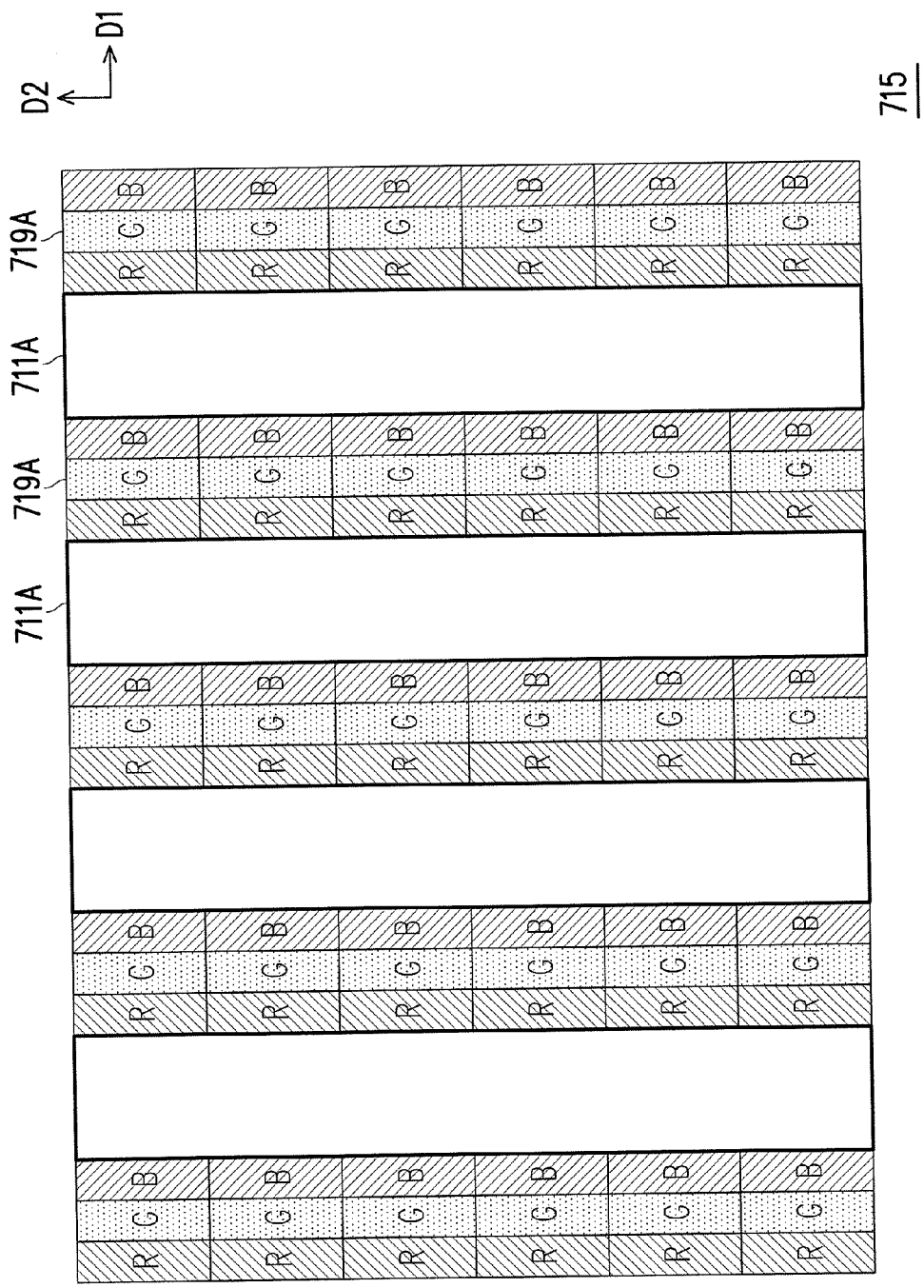
FIG. 9 and FIG. 10 are respectively top views of a first color filter and a second color filter according to another embodiment of the invention.
Figure 10:
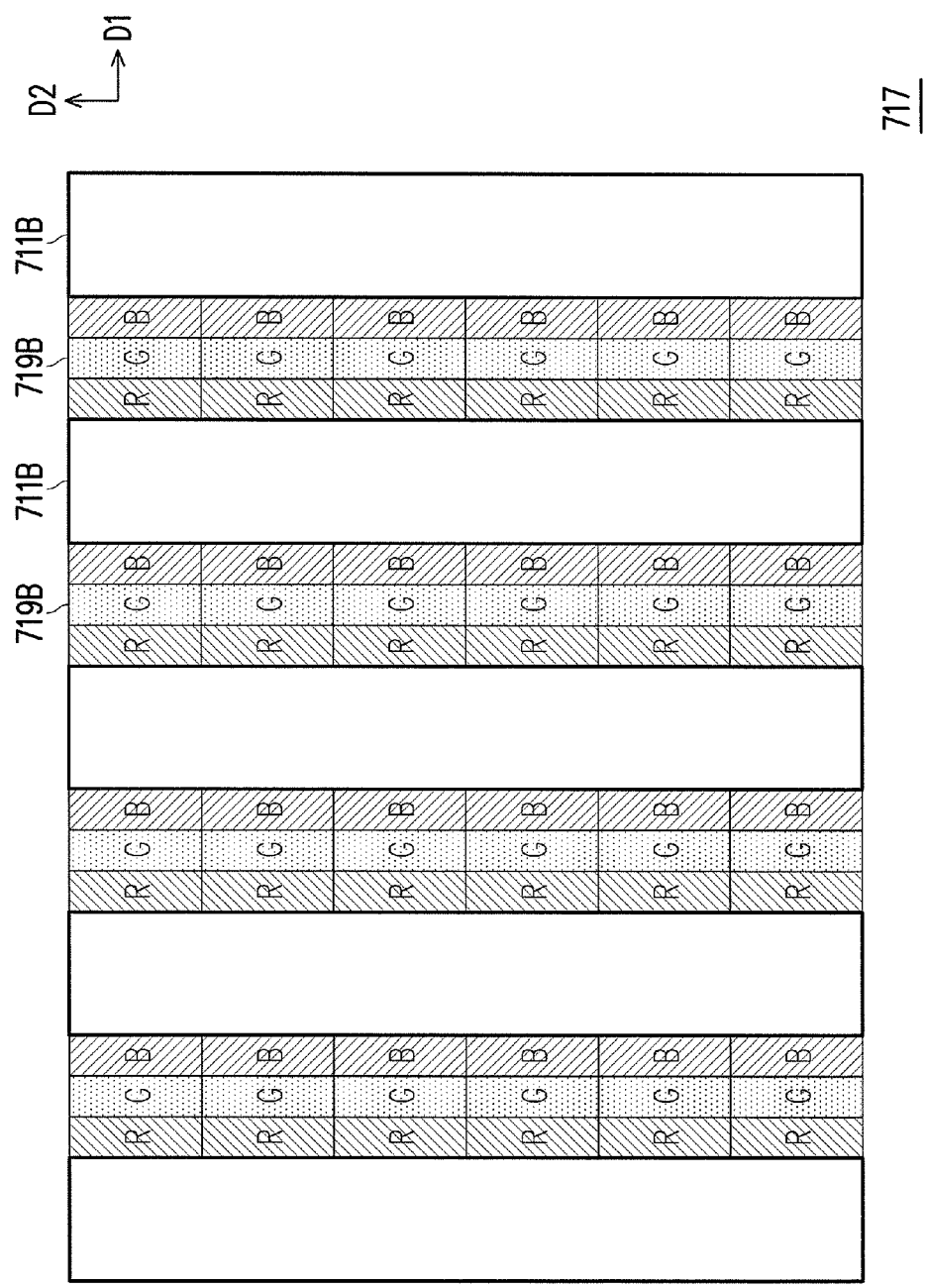

FIG. 9 and FIG. 10 are respectively top views of a first color filter and a second color filter according to another embodiment of the invention. Referring to FIG. 9 and FIG. 10, the first color filter 715 and the second color filter 717 of the embodiment serve as a combination to provide the DOF display mode. In the embodiment, transparent blocks 711A and filter blocks 719A of the first color filter 715 are respectively long straight bar-shaped, and transparent blocks 711B and filter blocks 719B of the second color filter 717 are respectively long straight bar-shaped. The long straight bar-shaped transparent blocks 711A and filter blocks 719A of the first color filter 715 are arranged in interleaving on the first color filter 715 to form straight bar patterns. The long straight bar-shaped transparent blocks 711B and filter blocks 719B of the first color filter 717 are also arranged in interleaving on the second color filter 717 to form corresponding straight bar patterns.

In detail, in the embodiment, the transparent blocks 711A and the filter blocks 719A of the first color filter 715 are arranged on the first color filter 715 along a first direction D1, and extend along a second direction D2. The transparent blocks 711B and the filter blocks 719B of the second color filter 717 are arranged on the second color filter 717 along the first direction D1, and extend along the second direction D2. In FIG. 9 and FIG. 10, the first direction D1 refers to a horizontal direction of the figure, and the second direction D2 refers to a vertical direction of the figure. The first direction D1 and the second direction D2 are not used to limit an arrangement direction and an extending direction of the transparent blocks and the filter blocks when the first color filter and the second color filter are actually manufactured.

It should be noticed that in the embodiment, the orthogonal projection of the transparent blocks 711A of the first color filter 715 on the second color filter 717 is coincided with the filter blocks 719B of the second color filter 717, and the orthogonal projection of the filter blocks 719A of the first color filter 715 on the second color filter 717 is coincided with the transparent blocks 711B of the second color filter 717.

Figure 11:
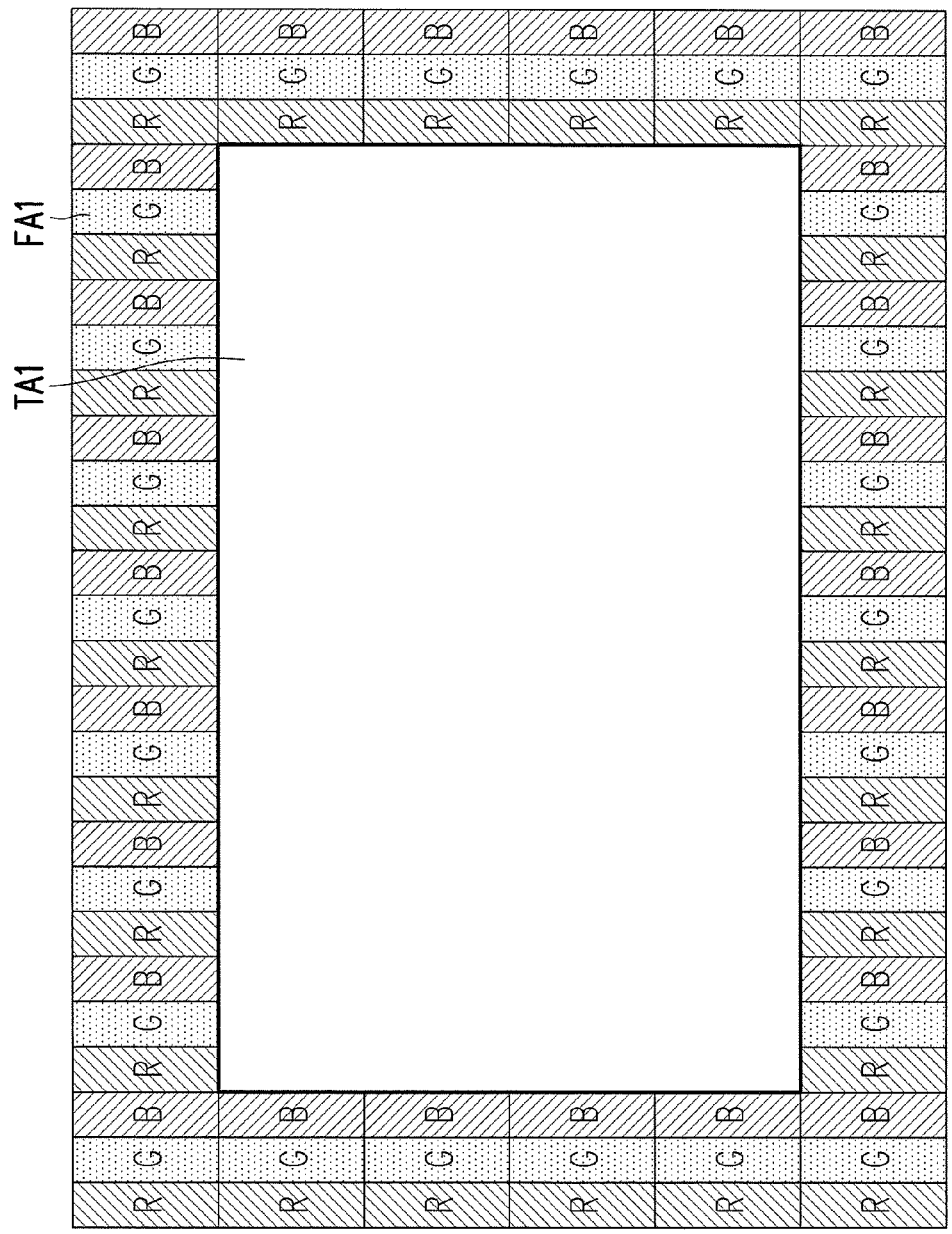
FIG. 11 and FIG. 12 are respectively top views of a first color filter and a second color filter according to another embodiment of the invention.
Figure 12:
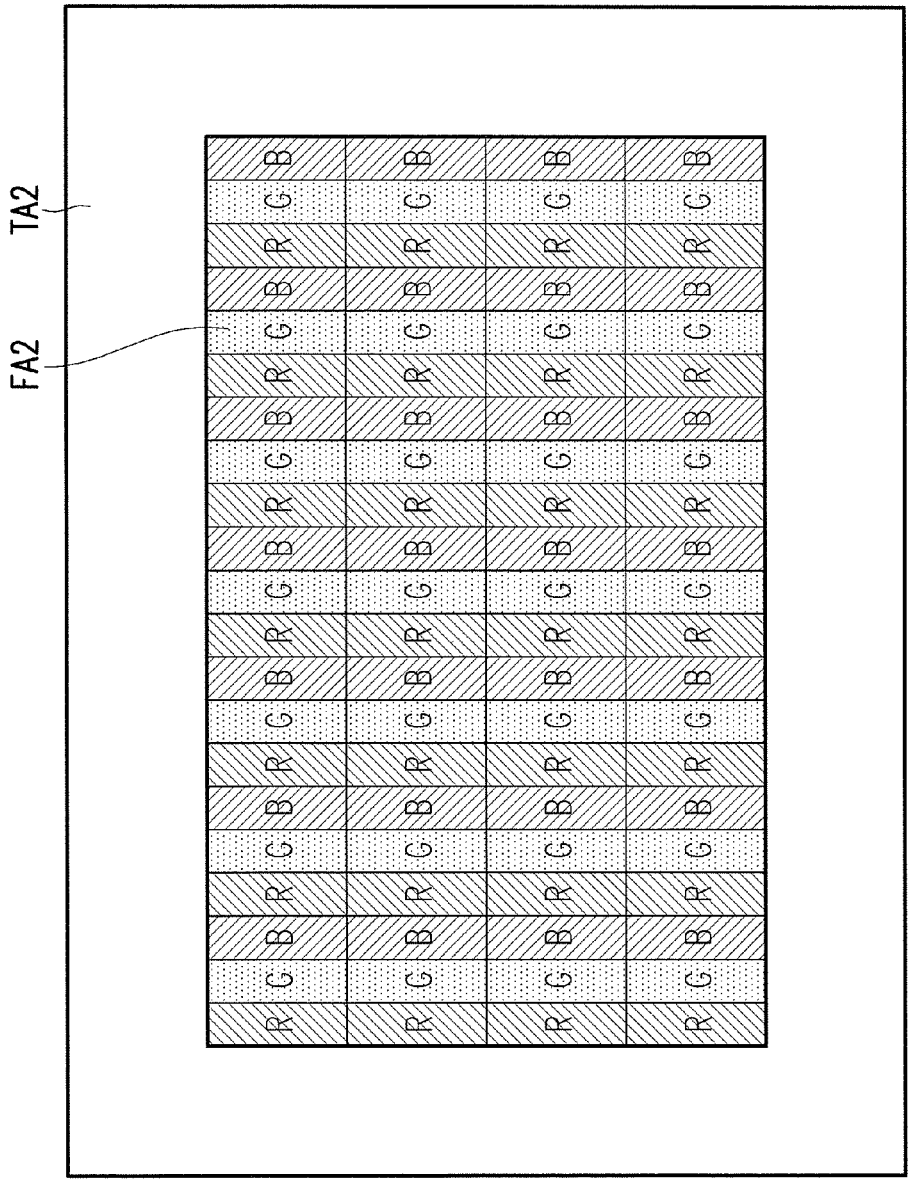

FIG. 11 and FIG. 12 are respectively top views of a first color filter and a second color filter according to another embodiment of the invention. Referring to FIG. 11 and FIG. 12, the first color filter 815 and the second color filter 817 of the embodiment serve as a combination to provide the DOF display mode. In the embodiment, on the first color filter 815, the filter area FA1 of the first color filter 815 surrounds the transparent area TA1 of the first color filter 815. On the second color filter 817, the transparent area TA2 of the second color filter 817 surrounds the filter area FA2 of the second color filter 817. It should be noticed that in the embodiment, the orthogonal projection of the transparent area TA1 of the first color filter 815 on the second color filter 817 is coincided with the filter area FA2 of the second color filter 817, and the orthogonal projection of the filter area FA1 of the first color filter 815 on the second color filter 817 is coincided with the transparent area TA2 of the second color filter 817.

In summary, the embodiments of the invention have at least one of following advantages or effects. In the LCD panel and the LCD module of the invention, the first color filter includes the transparent area and the filter area. The second color filter includes the corresponding transparent area and the filter area. The orthogonal projections of the transparent area and the filter area of the first color filter on the second color filter are respectively coincided with the filter area and the transparent area of the second color filter. The light beam is filtered by the first color filter and the second color filter of the LCD panel to provide the DOF display mode.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A liquid crystal display panel, comprising:
a first substrate;
a liquid crystal layer;
a second substrate, disposed opposite to the first substrate, wherein the second substrate and the first substrate commonly clamp the liquid crystal layer;
a first color filter, disposed on a surface of the first substrate, wherein the first color filter comprises a transparent area and a filter area, and the first substrate is located between the first color filter and the liquid crystal layer; and
a second color filter, disposed on a surface of the second substrate, wherein the second color filter comprises a transparent area and a filter area, and the second substrate is located between the second color filter and the liquid crystal layer,
wherein an orthogonal projection of the transparent area of the first color filter on the second color filter is coincided with the filter area of the second color filter, and an orthogonal projection of the filter area of the first color filter on the second color filter is coincided with the transparent area of the second color filter.

2. The liquid crystal display panel as claimed in claim 1, wherein the transparent area of the first color filter comprises a plurality of transparent blocks, the filter area of the first color filter comprises a plurality of filter blocks, and the transparent area of the second color filter comprises a plurality of transparent blocks, the filter area of the second color filter comprises a plurality of filter blocks.

3. The liquid crystal display panel as claimed in claim 2, wherein each of the filter blocks of the first color filter comprises a red sub-block, a green sub-block and a blue sub-block, and each of the filter blocks of the second color filter comprises a red sub-block, a green sub-block and a blue sub-block.

4. The liquid crystal display panel as claimed in claim 2, wherein the transparent blocks and the filter blocks of the first color filter are arranged in an array on the first color filter.

5. The liquid crystal display panel as claimed in claim 4, wherein the transparent blocks and the filter blocks of the first color filter form a mosaic pattern on the first color filter.

6. The liquid crystal display panel as claimed in claim 4, wherein the transparent blocks and the filter blocks of the first color filter are arranged in a triangle pattern on the first color filter.

7. The liquid crystal display panel as claimed in claim 2, wherein the transparent blocks and the filter blocks of the first color filter are respectively long straight bar-shaped, and the transparent blocks and the filter blocks of the second color filter are respectively long straight bar-shaped.

8. The liquid crystal display panel as claimed in claim 7, wherein the transparent blocks and the filter blocks of the first color filter are arranged on the first color filter along a first direction, and extend along a second direction, and the transparent blocks and the filter blocks of the second color filter are arranged on the second color filter along the first direction, and extend along the second direction.

9. The liquid crystal display panel as claimed in claim 8, wherein the transparent blocks and the filter blocks of the first color filter form a straight bar pattern on the first color filter.

10. The liquid crystal display panel as claimed in claim 2, wherein on the first color filter, the transparent blocks and the filter blocks of the first color filter are arranged in interleaving, and on the second color filter, the transparent blocks and the filter blocks of the second color filter are arranged in interleaving.

11. The liquid crystal display panel as claimed in claim 1, wherein on the first color filter, the filter area of the first color filter surrounds the transparent area of the first color filter, and on the second color filter, the transparent area of the second color filter surrounds the filter area of the second color filter.

12. The liquid crystal display panel as claimed in claim 1, further comprising:
a first polarizer, disposed on the first substrate, wherein the first color filter is disposed between the first polarizer and the first substrate; and
a second polarizer, disposed under the second substrate, wherein the second color filter is disposed between the second polarizer and the second substrate.

13. A liquid crystal display module, comprising:
a liquid crystal display panel, comprising:
a liquid crystal layer;
a first substrate;
a second substrate, disposed opposite to the first substrate, wherein the second substrate and the first substrate commonly clamp the liquid crystal layer;
a first color filter, disposed on a surface of the first substrate, and comprising a transparent area and a filter area, wherein the first substrate is located between the first color filter and the liquid crystal layer; and
a second color filter, disposed on a surface of the second substrate, and comprising a transparent area and a filter area, wherein the second substrate is located between the second color filter and the liquid crystal layer,
wherein an orthogonal projection of the transparent area of the first color filter on the second color filter is coincided with the filter area of the second color filter, and an orthogonal projection of the filter area of the first color filter on the second color filter is coincided with the transparent area of the second color filter; and
a backlight module, providing a light beam, wherein the light beam passes through the liquid crystal display panel to provide a depth of field display mode.

14. The liquid crystal display module as claimed in claim 13, wherein the transparent area of the first color filter comprises a plurality of transparent blocks, the filter area of the first color filter comprises a plurality of filter blocks, and the transparent area of the second color filter comprises a plurality of transparent blocks, the filter area of the second color filter comprises a plurality of filter blocks.

15. The liquid crystal display module as claimed in claim 14, wherein each of the filter blocks of the first color filter comprises a red sub-block, a green sub-block and a blue sub-block, and each of the filter blocks of the second color filter comprises a red sub-block, a green sub-block and a blue sub-block.

16. The liquid crystal display module as claimed in claim 14, wherein the transparent blocks and the filter blocks of the first color filter are arranged in an array on the first color filter.

17. The liquid crystal display module as claimed in claim 16, wherein the transparent blocks and the filter blocks of the first color filter form a mosaic pattern on the first color filter.

18. The liquid crystal display module as claimed in claim 16, wherein the transparent blocks and the filter blocks of the first color filter are arranged in a triangle pattern on the first color filter.

19. The liquid crystal display module as claimed in claim 14, wherein the transparent blocks and the filter blocks of the first color filter are respectively long straight bar-shaped, and the transparent blocks and the filter blocks of the second color filter are respectively long straight bar-shaped.

20. The liquid crystal display module as claimed in claim 19, wherein the transparent blocks and the filter blocks of the first color filter are arranged on the first color filter along a first direction, and extend along a second direction, and the transparent blocks and the filter blocks of the second color filter are arranged on the second color filter along the first direction, and extend along the second direction.

21. The liquid crystal display module as claimed in claim 20, wherein the transparent blocks and the filter blocks of the first color filter form a straight bar pattern on the first color filter.

22. The liquid crystal display module as claimed in claim 14, wherein on the first color filter, the transparent blocks and the filter blocks of the first color filter are arranged in interleaving, and on the second color filter, the transparent blocks and the filter blocks of the second color filter are arranged in interleaving.

23. The liquid crystal display module as claimed in claim 13, wherein on the first color filter, the filter area of the first color filter surrounds the transparent area of the first color filter, and on the second color filter, the transparent area of the second color filter surrounds the filter area of the second color filter.

24. The liquid crystal display module as claimed in claim 13, wherein the liquid crystal display panel further comprises:

a first polarizer, disposed on the first substrate, wherein the first color filter is disposed between the first polarizer and the first substrate; and a second polarizer, disposed under the second substrate, wherein the second color filter is disposed between the second polarizer and the second substrate.

* * * * *